United States Patent
Fujiwara et al.

(10) Patent No.: US 6,242,134 B1
(45) Date of Patent: Jun. 5, 2001

(54) METHOD OF PRODUCING POSITIVE ACTIVE MATERIAL FOR NON-AQUEOUS ELECTROLYTE SECONDARY BATTERIES

(75) Inventors: Takafumi Fujiwara, Moriguchi; Shoichiro Watanabe, Nara; Shigeo Kobayashi, Yawata; Akira Hashimoto, Sakai; Yasuhiko Shoji, Izumi; Tomoko Kawano, Moriguchi, all of (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/101,317

(22) PCT Filed: Nov. 5, 1997

(86) PCT No.: PCT/JP97/04029

§ 371 Date: Oct. 13, 1998

§ 102(e) Date: Oct. 13, 1998

(87) PCT Pub. No.: WO98/20571

PCT Pub. Date: May 14, 1998

(30) Foreign Application Priority Data

Nov. 7, 1996 (JP) ................................................ 8-295277

(51) Int. Cl.$^7$ ................................................ H01M 4/32
(52) U.S. Cl. .......................... 429/223; 421/221; 421/224; 421/231.1; 421/231.3; 421/231.95
(58) Field of Search ................................ 429/223, 224, 429/221, 231.1, 231.3, 231.95

(56) References Cited

U.S. PATENT DOCUMENTS 4,980,080  12/1990  Lecerf et al. .......................... 429/223
5,264,201  11/1993  Dahn et al. .......................... 429/218.1
5,955,051  * 9/1999  Li et al. ................................ 429/223
5,993,998  * 11/1999  Yasuda ................................ 429/231.95

FOREIGN PATENT DOCUMENTS 62-256371  11/1987  (JP).
5-325969  12/1993  (JP).
8-171910  7/1996  (JP).
8-222220  8/1996  (JP).

OTHER PUBLICATIONS

Japanese language search report for Int'l Appln. No. PCT/JP97/04029 dated Feb. 17 1998. copy of Form PCT/ISA/210.

* cited by examiner

Primary Examiner—Laura Weiner
(74) Attorney, Agent, or Firm—Ratner & Prestia

(57) ABSTRACT

The present invention relates to a method of producing a positive active material for a non-aqueous electrolyte secondary battery generally referred to as a lithium-ion secondary battery and is intended to provide a method of producing a new positive active material which is superior in both discharge capacity and cycle life through improvement of a complex oxide of lithium and nickel from which a high discharge capacity can be expected.

In order to attain this object, a Li-containing complex oxide is synthesized in this method by firing a mixture of a nickel oxide, in which an element M (M being at least an element selected from the group consisting of Co, Mn, Cr, Fe, and Mg) is dissolved as a solid solution, and lithium hydroxide or its hydrate. By using this as an active material in the positive electrode, it is possible to realize a non-aqueous electrolyte secondary battery which has a high capacity and a long cycle life, and which will not suffer from storage at a high temperature in a charged state.

8 Claims, 3 Drawing Sheets

METHOD OF PRODUCING POSITIVE ACTIVE MATERIAL FOR NON-AQUEOUS ELECTROLYTE SECONDARY BATTERIES

TECHNICAL FIELD OF THE INVENTION

This application is a U.S. National Phase application of the PCT International application PCT/JP97/04029.

The present invention relates to a method of producing positive active materials for secondary batteries employing a non-aqueous electrolyte such as organic electrolyte or polymer solid electrolyte.

BACKGROUND OF THE TECHNOLOGY

With the progress of electronics technologies in recent years, miniaturization, lighter weight, and lower power dissipation of electronic equipment have become possible along with sophistication of functions. As a result, a variety of cordless or portable consumer electronics equipment has been developed and commercialized and the market size is rapidly expanding. Typical examples include camcorders, lap top computers, and portable telephones. Further miniaturization and increasingly lighter weight as well as longer operating time of these equipment are always demanded. In association with this trend, there is a strong demand for continuing improvement in energy density and cycle life of small rechargeable batteries to be used in these equipment as a built-in power source. As built-in batteries, starting with lead-acid type and nickel-cadmium type batteries which were initially developed and commercialized, nickel-hydrogen (nickel-metal hydride system) storage batteries and lithium-ion secondary batteries which have higher capacity and higher energy density than these battery systems have subsequently been developed and commercialized. Among them, the lithium- ion secondary battery, which has a high energy density both per unit weight and per unit volume, is a battery system primarily using a complex oxide of lithium and a transition metal element as the positive electrode, a graphite-based carbon as the negative electrode, and a non-aqueous electrolyte such as organic electrolyte or polymer solid electrolyte as the electrolyte, and is recently enjoying a rapid growth in production. In this battery, during charge, lithium ions will desorb from the lithium-containing complex oxide of the positive electrode and transfer into the electrolyte, and at the same time, lithium ions of equal electrochemical equivalent will be fed from the electrolyte into the carbon of the negative electrode. Conversely, during discharge, lithium ions are fed to the positive electrode desorbing from the negative electrode. As this cycle is repeated, lithium-ion secondary battery is sometimes called a rocking-chair battery.

As the potential of the carbon negative electrode is close to the electrode potential of metallic lithium, a complex oxide of lithium which has a high electrode potential and a transition metal element is used as the positive electrode, for example, a complex oxide ($LiCoO_2$ of lithium and cobalt, a complex oxide ($LiNiO_2$) of lithium and nickel, and a complex oxide ($LiM_2O_4$) of lithium and manganese. These complex oxides are often called as lithium cobaltate, lithium nickelate, and lithium manganate.

In the currently commercialized batteries, $LiCOO_2$ which has a high potential and a long cycle life is most generally used as the positive active material. Under this situation, a use of $LiNiO_2$ with which a higher capacity than tat of $LiCoO_2$ is expected is now being actively studied. The reason for a higher capacity is because, as the electrode potential of $LiNiO_2$ is lower than that of $LiCoO_2$, it becomes possible to cause more quantity of lithium to desorb during charge before decomposition voltage of an aqueous electrolyte such as organic electrolyte is reached. As a result, the quantity of charged electricity is expected to increase, and hence the discharge capacity is also expected to increase.

Conversely, despite its large initial discharge capacity, $LiNiO_2$ suffers a problem of cycle deterioration by gradual decrease in the discharge capacity as charge and discharge are repeated.

As a result of disassembling a battery cell of which the discharge capacity has decreased due to repeated charge-discharge cycles and X-ray diffraction analysis of the positive active material by the inventors of this invention, a change of crystal structure was observed after charge and discharge cycles, which was confirmed to be the cause for deterioration.

Similar phenomenon has already been published by W. Li, J. N. Reimers and J. R. Dahn in Solid State Ionics, 67, 123 (1993). It is reported in this paper that, with the repetition of charge and discharge, lattice constant of $LiNiO_2$ changes while itself changes from a hexagonal to a mono-clinic system crystal, and further from a second hexagonal to a third hexagonal system crystal as lithium is desorbed. This type of change in crystal phase lacks reversibility and as charge-discharge reactions are repeated, the sites where insertion and desorption of lithium are possible are gradually lost. This phenomenon is considered to be the cause of decrease in the discharge capacity.

In contrast, with $LiCoO_2$, such a change in the crystal phase as described above on $LiNiO_2$ will not occur in the region of normal voltage (a voltage at which an organic electrolyte oxidizes and decomposes), suggesting that a decrease in the discharge capacity due to charge-discharge cycles is not likely to take place.

For the purpose of addressing the problem of decrease in discharge capacity of $LiNiO_2$ due to charge-discharge cycles, many proposals have heretofore been made to substitute a part of the element Ni with transition metal elements, primarily Co.

As an example, in Japanese Laid-open Patent No. Sho 62-256,371, a method of synthesizing a Li-containing complex oxide of Co and Ni by firing at 900° C. a mixture of lithium carbonate ($LiCO_3$, cobalt carbonate ($CoCO_3$), and nickel carbonate ($NiCO_3$).

Methods of synthesizing complex oxides are disclosed in Japanese Laid-open Patent No. Sho 62-299,056 in which a mixture of carbonates, hydroxides, and oxides of Li, Co, and Ni is used as the raw material, and in U.S. Pat. No. 4,980,080 in which a mixture of lithium hydroxide (LiOH), Ni oxides and Co oxides is used as the raw material, and both heated at 600° C. to 800° C.

In addition, in U.S. Pat. No. 5,264,201 and other patents, methods of synthesizing Li-containing complex oxides are disclosed in which lithium hydroxide (LiOH) is added to and mixed with a uniform mixture of oxides or hydroxides of Ni and oxides or hydroxides of Fe, Co, Cr, Ti, Mn, or V, followed by heat treatment at a temperature not lower than 600° C.

Furthermore, in Japanese Laid-open Patent No. Hei 1-294,364 and other patents, methods of synthesizing Li-containing complex oxides are disclosed in which carbonates, more precisely basic carbonates, of Ni and Co are co-precipitated from an aqueous solution containing Ni ions and Co ions, and a mixture of the co-precipitated carbonates and $Li_2CO_3$ is fired.

There have also been proposed a method in which a Ni-containing oxide and a Co-containing oxide are mixed and fired after being further mixed with carbonates or oxides of Li, and a method in which a Li-containing complex oxide is synthesized by using oxides containing both Ni and Co such as $NiCo_2$.

These inventions represent efforts to relax a change in crystal phase by substituting a part of Ni with Co or other transition metal elements. The reason why there are many proposals to substitute part of Ni with Co from among different transition metals is because substitution is easy as the ion radius of Co is approximately equal to that of Ni and that the bond strength of Co with oxygen is stronger than that of Ni, which suggest that the crystal structure may become more stable and that the decrease in discharge capacity due to charge-discharge cycles may be improved.

However, not all of the three battery characteristics, namely, discharge capacity, cycle life characteristic, and reliability as a battery, could be satisfied by the Li-containing complex oxides represented by a chemical formula $Li_xNi_yCo_zO_2$ ($0.90 \leq x \leq 1.10$, $0.7 \leq y \leq 0.95$, $y+z=1$) as obtained by the methods of synthesis heretofore been disclosed or proposed. For example, even though a positive electrode produced by using a Li-containing complex oxide synthesized from a mixture of each respective carbonates, hydroxides, or oxides of Li, Co, and Ni did have a certain large initial discharge capacity, the discharge capacity decreased with charge-discharge cycles though not as markedly as with $LiNiO_2$ of which no Ni had been substituted with Co and it was not satisfactory as a positive active material.

A close study of the causes of such performance deterioration by the inventors of the present invention has revealed that, in the conventional methods of production, as the quantity (value of z) of Co substituting Ni increases ($z \geq 0.1$), in reality, Ni and Co are not uniformly dispersed in the obtained complex oxide, partially leaving $LiNiO_2$ and $LiCoO_2$ as a mixture. It has been found that although a positive electrode made from these active materials shows a somewhat large discharge capacity, the part not properly substituted with Co had caused a change in the crystal phase with repeated charge and discharge, thus damaging the crystal structure and loosing reversibility, resulting in the decrease of discharge capacity.

To address the non-uniform dispersion of Ni and Co in such active materials, a method of producing a positive active material using as the raw material carbonates co-precipitated from an aqueous solution of a mixture of Ni ions and Co ions is proposed in Japanese Laid-pen Patent No. Hei 1-294,364. With this method, it is true that a carbonate in which Ni and Co are uniformly dispersed can be obtained. However, when this co-precipitated carbonate is mixed with $Li_2CO_3$ and fired, the co-precipitated carbonate is first decomposed generating a large volume of carbon dioxide ($CO_2$) causing an increase in the $CO_2$ partial pressure of the firing atmosphere. It further causes a decrease in the partial pressure of oxygen ($O_2$) which is necessary for producing a complex oxide, and blocks the progress of the synthesizing reaction. Consequently, unless some forcible means of increasing $O_2$ partial pressure is adopted, it has been difficult to obtain a perfect complex oxide. As a result, when using a Li-containing complex oxide synthesized by conventional methods of production, although the deterioration of discharge capacity due to charge-discharge cycles may be low, the initial discharge capacity is not necessarily high and is considered to be insufficient. Furthermore, because of the presence of $CO_2$ during synthesis, $Li_2CO_3$ remains mixed as an excess lithium salt after synthesis has been completed. When a cell which uses an active material containing this $Li_2CO_3$ is stored at a high temperature of 80° C. in a charged state, $Li2CO_3$ in the positive electrode decomposes and releases $CO_2$, thus causing an increase in the internal cell pressure. Therefore, this production method has not been put into practice.

In addition to these methods, there is a method to use NiCoO as a synthesizing material and lithium oxide ($Li_2O$) as a source of supply of Li. However, as the melting point of $Li_2O$ is not lower than 1,700° C., the reactivity is low and a perfect Li-containing complex oxide could not be synthesized. Consequently, the initial discharge capacity of a cell using a positive electrode made of this complex oxide was not satisfactory.

As a means for uniformly dispersing Ni and Co, apart from the use of co-precipitated carbonates of Ni and Co or $NiCoO_2$, there exists a method of co-precipitating them as hydroxides, or a method of production by mixing a Ni hydroxide in which Co is dissolved as a solid solution and a lithium salt and then firing. In this production method, too, the hydroxide as the raw material decomposes first and a large volume of 120 is generated. Since the $H_2O$ partial pressure increases, it is difficult to maintain the $O_2$ partial pressure of the firing atmosphere at a level appropriate to synthesize a perfect Li-containing complex oxide as in the case of use of a co-precipitated carbonate as the raw material, and hence the progress of synthesizing reaction is blocked.

Consequently, a co-precipitated hydroxide of Ni and Co is first thermally decomposed at 190° C. to 250° C. to prepare $(Ni_yCo_{1-y})_3O_4$ or $Ni_yCo_{1-y}O$. There is a published report of mixing LiOH to these oxides and firing at 450° C. (Ref. J. Solid State Chemistry, 113, 182–192(1994)). In this method, presumably because the firing temperature during synthesis was relatively low, nonreacted lithium compounds ($Li2CO3$ and LiOH) were observed by X-ray diffraction analysis when the quantity of substitution of Ni with Co was not greater than 60 mol %. Consequently, it was not possible to synthesize a perfect Li-containing complex oxide even with this method.

The present invention aims at addressing various problems encountered in using Li-containing complex oxides synthesized by the heretofore proposed or reported methods of production as positive active materials. That is, as a result of studying conventional methods of production in detail, the present invention provides a new method of production of positive active material for a high-reliability non-aqueous electrolyte secondary battery of which the discharge capacity is high and the decrease of the discharge capacity due to charge-discharge cycles is controlled by using in the positive electrode a Li-containing complex oxide obtained by using nickel oxides in which a specific element has been dissolved as a solid solution as a synthesizing material, and firing it using LiOH or a mixture of LiOH and its hydrates as the source of supply of Li.

DISCLOSURE OF THE INVENTION

The present invention provides a method of production of a positive active material for a non-aqueous electrolyte secondary battery in which a Li-containing complex oxide as represented by a chemical formula $Li_xNi_yM_zO_2$ (M being at least an element selected from the group consisting of Co, Mn, Cr, Fe and Mg; $0.90 \leq x \leq 1.10$, $0.7 \leq y \leq 0.95$, $y+z=1$) is synthesized by firing a mixture of nickel oxide containing M dissolved as a solid solution as represented by a chemical formula $Ni_vM_wO$ ($0.7 \leq v \leq 0.95$, $v+w=1$) and LiOH or its hydrates. By employing this active material in the positive electrode of a non-aqueous electrolyte secondary battery, it has become possible to realize a high-reliability battery with which the discharge capacity during the initial cycles is large and the decrease of the discharge capacity due to charge-discharge cycles is lowered.

DESCRIPTION OF THE PREFERRED EMBODIMENTS

Exemplary embodiments of the present invention will be described in the following referring to drawings and tables.

First Exemplary Embodiment

To begin with, aqueous solutions of mixed sulfates were prepared with various atomic ratios of Ni and Co by using nickel sulfate ($NiSO_4$) and cobalt sulfate ($CoSO_4$). By pouring an aqueous solution of sodium hydroxide (NaOH) to this and stirring, a precipitate in which Ni hydroxide and Co hydroxide are uniformly dispersed is obtained by co-precipitation. After fully washing this precipitate with water, it was filtered and dried at 80° C. to obtain $Ni_yCo_w(OH)_2$. By thermally decomposing this hydroxide at 700° C. for 5 hours, an oxide, $Ni_yCo_wO$, of Ni and Co was prepared.

Next, by adding a monohydrate ($LiOH \cdot H_2O$) of lithium hydroxide to $Ni_yCo_wO$ of varying compositions at a ratio of 1.05 to 1 so that the constituent Li atom is slightly in excess of each pair of (Ni+Co) atoms of the latter in number and fully mixing, the mixture was heated at 700° C. for 10 hours in an oxidizing atmosphere to obtain a Li-containing complex oxide ($Li_xNi_yCo_zO_2$) of Ni and Co.

The synthesized $Li_xNi_yCo_zO_2$ is a relatively fragile aggregate, which is easily pulverized in a mortar.

A positive paste is then prepared by mixing 100 parts by weight of $Li_xNi_yCo_zO_2$ powder, 3 parts by weight of acetylene black, and 5 parts by weight of fluorocarbon resin binder, and adding to the mixture N-methylpyrolidinone and blending. The paste is then coated on both sides of an aluminum foil having a thickness of 0.02 mm and rolled so that a thickness of 0.13 mm can be obtained after drying. It is then cut to a width of 35 mm and length of 270 mm to obtain a positive electrode.

Figure 1:
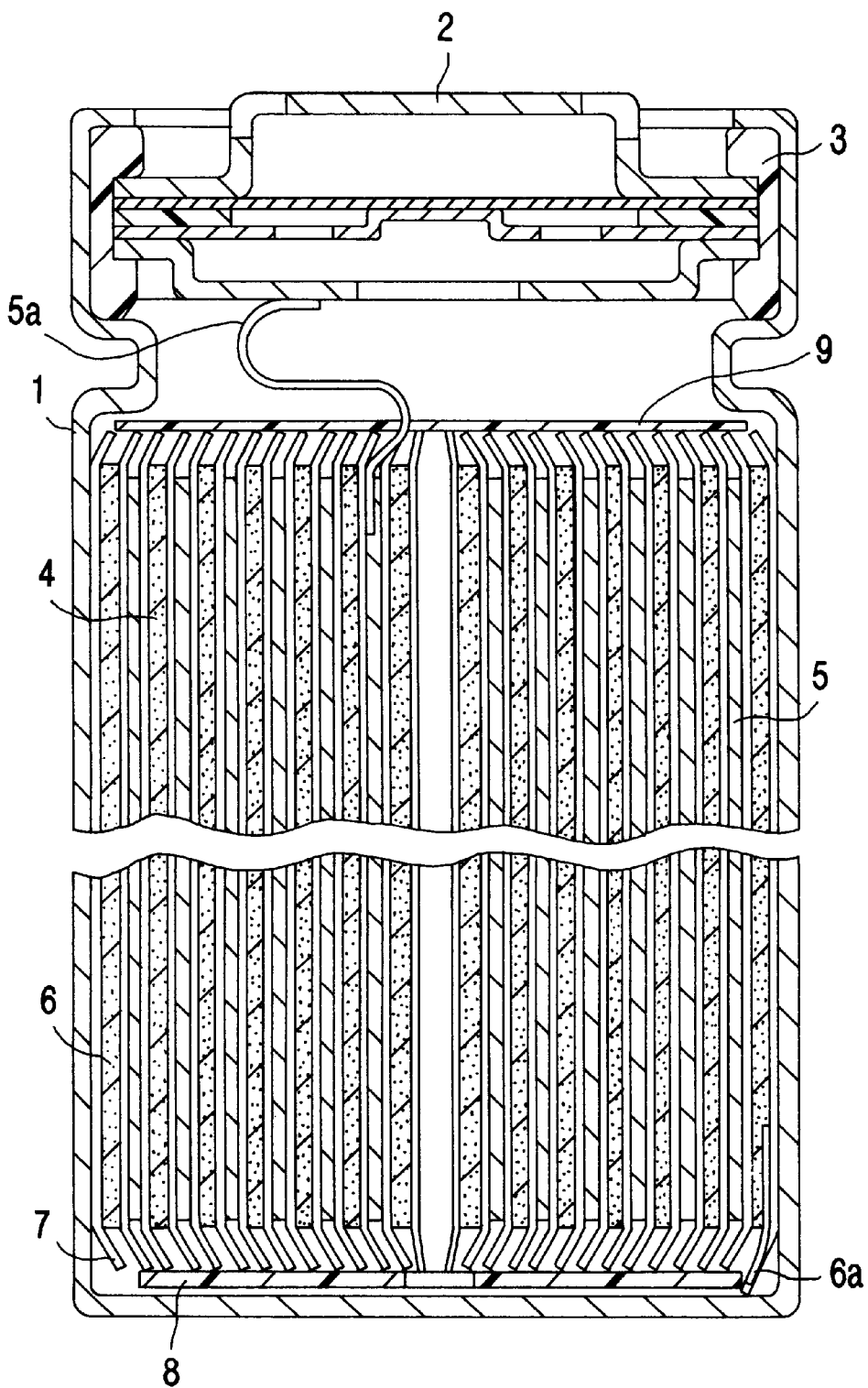
FIG. 1 is a vertical cross-sectional view of a cylindrical test cell produced for comparison between exemplary embodiments of the present invention and a conventional example.

Using this positive electrode, a cylindrical test cell with a diameter of 13.8 mm and a total height of 50 mm was produced as illustrated by the vertical cross sectional view in FIG. 1.

In FIG. 1, an electrode group 4 is configured by spirally winding a positive electrode 5 and a negative electrode 6 with a separator 7 interposed, and is housed inside a cell case 1 made of stainless steel plate with insulating plates 8 and 9 provided on top and bottom surfaces of the electrode group 4. An aluminum lead ribbon 5a provided in advance on the positive electrode 5 is connected by welding to the bottom surface of a seal plate 2 which has a built-in explosion proof mechanism. A nickel lead ribbon 6a provided in advance on the negative electrode 6 is welded to the inner bottom surface of the cell case 1. After pouring and impregnating an organic electrolyte in the electrode group 4, the seal plate 2 which has been fit with a gasket 3 in advance is forced into the upper periphery of the cell case 1, after which the upper periphery of the cell case 1 is sealed by burring inward to obtain a completed cell.

The negative electrode 6 is made by first preparing a paste by adding to a mixture of 100 parts by weight of graphite powder and 10 parts by weight of fluorocarbon resin binder an aqueous solution of carboxymethyl cellulose and blending. The paste is then coated on both sides of a copper foil having a thickness of 0.015 mm and rolled to an after-dry thickness of 0.2 mm, and cut to a width of 37 mm and a length of 280 mm.

As the organic electrolyte, a solution prepared by dissolving lithium hexafluorophosphate ($LiPF_6$) in an equal-volume mixed solvent of ethylene carbonate and diethyl carbonate to a concentration of 1 mol/l.

In addition to the above test cell, a comparative test cell (P-1) based on a conventional method was also produced by using a positive active material based on a complex oxide of Li and Ni prepared by using nickel hydroxide, $Ni(OH)_2$, no part of the Ni of which has been substituted with Co, as the starting material, with other conditions the same, and using the same materials and components as the above test cell with the exception of use of this material as the positive active material. Here the discharge capacity of the negative electrode of the test cell was made larger so that the discharge capacity of the test cell can be regulated by the discharge capacity of the positive electrode.

Each of the above test cells was subjected to a charge-discharge test under the following conditions. After being charged at a constant current of 120 mA at 20° C. to a voltage of 4.2 V, the cells were left for 1 hour, and then discharged at a constant current of 120 mA until an end voltage of 3.0 V was reached, and this process was repeated.

The discharge capacity of the third cycle was defined as the initial capacity and the number of charge-discharge cycles until the discharge capacity decreased to 50% of the initial capacity was defined as the life. Also, specific capacity (mAh/g) of the positive active material was obtained by the loaded amount of Li-containing complex oxide used as the positive active material in each cell and the initial capacity. Table 1 summarizes the test results.

It can be seen from Table 1 that though the initial capacity of the comparative test cell No. P-I in which no part of Ni has been substituted with Co is high, the life is extremely short. This is considered to be due to a poor reversibility of charge-discharge reaction causing a change of the crystal phase of the positive active material and to a gradual loss of the sites for insertion and desorption of Li as described earlier.

TABLE 1

(a) Cell No.
(b) Ratio of Ni substituted with Co(atomic %)
(c) Composition of oxide materials for synthesis of Li-containing complex oxides
(d) Initial capacity (mAh)
(e) Specific capacity of active material (mAh/g)
(f) Life (cycles)

| (a) | (b) | (c) | (d) | (e) | (f) |
|---|---|---|---|---|---|
| P-1 | 0 | $Ni_{1.0}Co_0O$ | 774 | 172 | 120 |
| 1-1 | 5 | $Ni_{0.95}Co_{0.05}O$ | 788 | 175 | 400 |
| 1-2 | 10 | $Ni_{0.9}Co_{0.1}O$ | 797 | 177 | 420 |
| 1-3 | 20 | $Ni_{0.8}Co_{0.2}O$ | 792 | 176 | 456 |
| 1-4 | 30 | $Ni_{0.7}Co_{0.3}O$ | 779 | 173 | 440 |
| 1-5 | 40 | $Ni_{0.6}Co_{0.4}O$ | 743 | 165 | 210 |

In contrast, with the exception of the cell No. 1-5, in cells the positive active material of which is based on a Li-containing complex oxide synthesized by using nickel-cobalt oxide with a part of the Ni substituted with Co, both the specific capacity and life showed such a superior value as 170 mAh/g and 400 cycles, respectively. This is considered to be due to an effective control of change of the crystal phase due to charge-discharge cycles by the substitution of 5 to 30 atomic % of the Ni with Co.

However, when the ratio of Co substitution reaches 40 atomic % as in the cell No. 1-5, the specific capacity of the active material decreases and the life characteristic lowers. It is considered that when the percentage of Co substitution is increased like this, open circuit voltage of the cell increased and the quantity of charged electricity until charging to 4.2 V decreased, thus lowering the initial capacity and hence the specific capacity of the active material. It is also likely that, in the Li-containing complex oxide obtained, as the Ni and Co are not in a state of a uniform solid solution, a mixture of $LiNiO_2$ and $LiCoO_2$ is locally generated, and in the part where Ni is not fully substituted with Co, a change of crystal phase has occurred, thus damaging the crystal structure and lowering the cycle characteristic.

On the cell Nos. 1-1, 1-2, 1-3, and 14 which showed a high initial capacity, a small decrease in discharge capacity due to charge-discharge cycles, and a long life, the products produced during the process of synthesis of the positive active material were identified by elementary analysis. The co-precipitated hydroxide used as the star ting material is represented by a chemical formula $Ni_\alpha Co_\beta(OH)_2$ ($0.7 \leq a \leq 0.95$, a+b=1). The nickel-cobalt oxide obtained by thermally decomposing the co-precipitated hydroxide is represented by a chemical formula $Ni_v Co_w O$ ($0.7 \leq v \leq 0.95$, v+w=1). By using the above nickel-cobalt oxide as the material for synthesis and $LiOH \cdot H_2O$ as the source of supply of Li and firing at 700° C. for 10 hours in an oxidizing atmosphere, the material produced was found to be represented by a chemical formula $Li_x Ni_y CO_z O_2$ ($0.90 \leq x \leq 1.10$, $0.7 \leq y \leq 0.95$, y+z=1).

By using the Li-containing complex oxide thus prepared as the positive active material, a non-aqueous electrolyte secondary battery which is superior in discharge capacity and in life characteristic can be obtained.

Second Exemplary Embodiment

It was confirmed in the first exemplary embodiment that $Ni_v Co_w O$ which is appropriate as a material for synthesizing a Li-containing complex oxide can be obtained by thermally decomposing at 700° C. a hydroxide $Ni_v Co_w(OH)_2$ obtained by co-precipitation from an aqueous solution of mixed sulfates of Ni and Co and in which Ni and Co are uniformly dispersed at a predetermined ratio.

In this exemplary embodiment, the influence of the thermal decomposition temperature on $Ni_{0.8}Co_{0.2}(OH)_2$ was studied over a wide range of temperature points as 200, 250, 300, 500, 700, 900, 1000, and 1100° C. with the quantity of Co substituting Ni fixed at 20 atomic %.

With other conditions kept exactly the same as in the first embodiment, Li-containing complex oxides were synthesized, and positive electrodes using them as the active material and test cells using these positive electrodes were produced. Further, these test cells were subjected to charge-discharge tests under the same conditions as in the first exemplary embodiment, and the results are shown in Table 2.

As is clear from Table 2, the initial capacity of the cell No. 2-1 of which the thermal decomposition temperature of $Ni_{0.8}Co_{0.2}(O)_2$ was 200° C. was slightly low and the life was also short.

TABLE 2

| Cell No. | Thermal Decomp. Temperature (° C.) | Initial Capacity (mAh) | Specific Capacity of Active Material (mAh/g) | Life (cycles) |
| --- | --- | --- | --- | --- |
| 2-1 | 200 | 752 | 167 | 370 |
| 2-2 | 250 | 783 | 174 | 435 |
| 2-3 | 300 | 792 | 176 | 448 |
| 2-4 | 500 | 797 | 177 | 452 |
| 1-3 | 700 | 792 | 176 | 456 |
| 2-5 | 900 | 788 | 175 | 439 |
| 2-6 | 1000 | 774 | 172 | 432 |
| 2-7 | 1100 | 723 | 161 | 360 |

It is conceivable that, at a heating temperature of 200° C., a perfect $Ni_{0.8}Co_{0.2}O$ was not produced with the raw material $Ni_{0.8}Co_{0.2}(OH)_2$ locally remaining, and, as a result, when synthesized by firing after being added with $LiOH \cdot H_2O$, $H_2O$ is generated from the residual hydroxide thereby lowering the $O_2$ partial pressure of the firing atmosphere and blocking synthesizing reaction. Also, with the cell No. 2-7 in which the thermal decomposition temperature was as high as 1100° C., the initial capacity, the specific capacity of the active material, and the life were all low. This may be attributed to the fact that a nickel-cobalt oxide such as $Ni_{0.8}Co_{0.2}$ has a characteristic of making a sudden crystal growth when the temperature exceeds 1000° C., and that the nickel-cobalt oxide which has been in a polycrystalline state until then turns to single crystals by crystal growth thus grain size becoming large. Therefore, it is further conceivable that, when synthesizing a Li-containing complex oxide from nickel-cobalt oxide as such, it is difficult for Li to be inserted into the center of a grain and the progress of synthesizing reaction is blocked.

When the thermal decomposition temperature of $Ni_{0.8}Co_{0.2}(OH)_2$ was in the range of 250° C.–1000° C., both initial capacity and life were confirmed to show superior values.

As has been described earlier, it became clear that a Li-containing complex oxide prepared by using $Ni_v Co_w (OH)_2$ as the starting material, $Ni_v Co_w O$ obtained by thermally decomposing the starting material at 250° C.–1000° C. for 5 hours as the material for synthesis, and $LiOH \cdot H_2O$ as the source of supply of Li, can exhibit a superior discharge capacity and cycle life characteristic as a positive active material for a non-aqueous electrolyte secondary battery. Here, it is to be noted that, although generally available monohydrates of lithium hydroxide were used as the source of supply of Li when synthesizing Li-containing complex oxides in the first and second exemplary embodiments, an equal effect can be obtained by the use of anhydrous LiOH which has been dehydrated in advance.

Next, with the quantity of Ni substituted with Co fixed at the same 20 atomic % as in Table 2, conventional examples of various positive active materials were produced and compared with the exemplary embodiments of the present invention by using co-precipitated $Ni_{0.8}Co_{0.2}CO_3$ as the starting material in addition to $Ni_{0.8}Co_{0.2}(OH)_2$, the same co-precipitated $Ni_{0.8}Co_{0.2}(OH)_2$ as used as the starting material, a mixture of NiO and $Co_3O_4$ and co-precipitated $Ni_{0.8}Co_{0.2}CO_3$ as the synthesizing materials in addition to $Ni_{0.8}Co_{0.2}(OH)_2$, and $Li_2CO_3$ or lithium oxide ($Li_2O$) as the source of supply of Li in addition to $LiOH \cdot H_2O$. Here, the atomic ratio (Ni +Co) : Li for synthesis of Li-containing complex oxide was chosen to be 1.0:1.05, and the firing condition of synthesis was fixed at 700° C. for 10 hours in an oxidizing atmosphere.

Methods of synthesis of each conventional example are as follows.

Second Conventional Example

A Li-containing complex oxide was synthesized by using the starting material of the present invention as it is, namely, co-precipitated $Ni_{0.8}Co_{0.2}(OH)_2$ as the synthesizing material, and $LiOH \cdot H_2O$ as the source of supply of Li.

Third Conventional Example

A Li-containing complex oxide was synthesized by using mixed powders of NiO and $Co_3O_4$ at a ratio in mole of 8:2/3 as the synthesizing material and $LiOH \cdot H_2O$ as the source of supply of Li.

Fourth Conventional Example

An excess amount of an aqueous solution of sodium bicarbonate ($NaHCO_3$) was added to an aqueous solution prepared by dissolving nickel chloride ($NiCl_2 \cdot H_2O$) and cobalt chloride ($CoCl_2 \cdot H_2O$) at a ratio in mole of 8:2 in water saturated with Co to obtain a co-precipitated $Ni_{0.8}Co_{0.2}CO_3$. By using the co-precipitated carbonate as the synthesizing material after it was washed and dried and $LiOH \cdot H_2O$ as the source of supply of Li, a Li-containing complex oxide was synthesized.

Fifth Conventional Example

Using the co-precipitated $Ni_{0.8}Co_{0.2}CO_3$ prepared in the fourth conventional example as the starting material and thermally decomposing it at 700° C. for 5 hours, $Ni_{0.8}Co_{0.2}O$ was obtained. Using it as the synthesizing material and $LiOH \cdot H_2O$ as the source of supply of Li, a Li-containing complex oxide was synthesized.

Sixth Conventional Example

Using the $Ni_{0.8}Co_{0.2}O$ prepared in the first exemplary embodiment as the synthesizing material and $Li_2CO_3$ as the source of supply of Li, a Li-containing complex oxide was synthesized.

Seventh Conventional Example

Using the $Ni_{0.8}Co_{0.2}O$ prepared in the first exemplary embodiment as the synthesizing material as in the sixth conventional example and $Li_2O$ as the source of supply of Li, a Li-containing complex oxide was synthesized.

Positive electrodes that use Li-containing complex oxides synthesized by the second through seventh conventional examples were made, and test cells were produced by using these positive electrodes under the same conditions as the first exemplary embodiment. These test cells were subjected to a charge-discharge test under the same conditions as the first exemplary embodiment, and the results obtained are shown in Table 3.

From Table 3, it can be seen that though the cell No. P-3 of the third conventional example had a relatively superior initial capacity of 170 mAh/g in terms of specific capacity of the active material, the life was extremely short when compared with the exemplary embodiments of the present invention. This may be attributed to the use of a mixture of NiO and $Co_3O_4$ as the synthesizing material, which might have caused synthesis of a Li-containing complex oxide in which $LiNiO_2$ and $LiCO_2$ are locally mixed, a situation different from the case of use of $Ni_{0.8}Co_{0.2}O$ in an exemplary embodiment of the present invention. Therefore, in the regions where Ni has not been fully substituted by Co, changes of the crystal phase might have occurred and the crystal structure might have been damaged, thus lowering the discharge capacity and shortening the life.

The cells No. P-2 and P4 in accordance with the second and fourth conventional examples had a relatively long life exceeding 300 cycles, but the initial capacity was slightly lower than in exemplary embodiments of the present invention. This is considered to be due to the use of co-precipitated hydroxides and carbonates as they were as the synthesizing material, which has caused generation of a large volume of $H_2O$ or $CO_2$ during firing for synthesis. As a result, the partial pressure of $O_2$ of the firing atmosphere was lowered, thus failing in preparing a perfect complex oxide.

The cell No. P-5 in accordance with the fifth conventional example is superior in both the initial capacity and the life characteristic. However, when stored in a separate test at a high temperature of 80° C. in a charged state, the explosion-proof mechanism of the seal plate started to operate, allowing a gas inside the cell to be released and the electrolyte to leak out.

TABLE 3

| | | | (2) | | | | |
|---|---|---|---|---|---|---|---|
| | | | | (5) | | | |
| (1) | (3) | (4) | (6) | (7) | (8) | (9) | (10) |
| 1-3 | Present Invention | $Ni_{0.8}Co_{0.2}(OH)_2$ | $Ni_{0.8}Co_{0.2}O$ | $LiOH.H_2O$ | 792 | 176 | 456 |
| P-2 | Conv. Ex. 2 | — | $Ni_{0.8}Co_{0.2}(OH)_2$ | $LiOH.H_2O$ | 747 | 166 | 362 |
| P-3 | Conv. Ex. 3 | — | $NiO + Co_3O_4$ | $LiOH.H_2O$ | 765 | 170 | 153 |
| P-4 | Conv. Ex. 4 | — | $Ni_{0.8}Co_{0.2}CO_3$ | $LiOH.H_2O$ | 711 | 158 | 310 |
| P-5 | Conv. Ex. 5 | $Ni_{0.8}Co_{0.2}CO_3$ | $Ni_{0.8}Co_{0.2}O$ | $LiOH.H_2O$ | 770 | 171 | 402 |
| P-6 | Conv. Ex. 6 | $Ni_{0.8}Co_{0.2}(OH)_2$ | $Ni_{0.8}Co_{0.2}O$ | $Li_2CO_3$ | 765 | 170 | 360 |
| P-7 | Conv. Ex. 7 | $Ni_{0.8}Co_{0.2}(OH)_2$ | $Ni_{0.8}Co_{0.2}O$ | $Li_2O$ | 743 | 165 | 365 |

(1) Cell No.
(2) Positive Active Material
(3) Type
(4) Starting Material
(5) Synthesis
(6) Material
(7) Source of Li
(8) Initial Capacity (mAh)
(9) Specific Capacity of Active Material (mAh/g)
(10) Life (cycles)

This is due to a small amount of residual carbonate caused when using a co-precipitated $Ni_{0.8}Co_{0.2}CO_3$ as the starting material and from which $Ni_{0.8}Co_{0.2}O$ was prepared by thermal decomposition. When synthesizing a Li-containing complex oxide, this residual carbonate and LiOH react with each other producing a small amount of $LiCO_3$, which remains mixed in the complex oxide. It is conceivable that this $Li_2CO_3$ is eventually contained in the positive electrode, and when a cell is left at a high temperature in a charged state, $Li_2CO_3$ decomposes within the cell causing an increase in the internal cell pressure due to $CO_2$ gas generated. Therefore, it is improper to use a co-precipitated carbonate as the starting material to prepare a Ni·Co oxide as a synthesizing material as in the fifth conventional example.

With the cell No. P-6 in accordance with the sixth conventional example in which $Li_2CO_3$ was used as the source of supply of Li, it was superior in both the initial capacity and life characteristic as in No. P-5 in accordance with the fifth conventional example, but it suffered a problem of an increase in the internal cell pressure when stored at a high temperature in a charged state. The reason for this problem is also considered to be due to non-reacted excess of $Li_2CO_3$ used as the source of supply of Li remaining in the positive active material as in the case of the cell No. P-5. Consequently, it is improper to use $Li_2CO_3$ as a source of supply of Li.

In the seventh conventional example, $Ni_{0.8}Co_{0.2}O$ was used as the synthesizing material as in the exemplary embodiments of the present invention. Presumably because $Li_2O$ was used as a source of supply of Li, the life characteristics of the cell No. P-7 was superior but the initial capacity was not satisfactory. This may be attributed to too high a melting point exceeding 1700° C. of $Li_2O$ used as the source of supply of Li that poor reactivity was caused leading to a failure in synthesizing a perfect Li-containing complex oxide.

Figure 2:
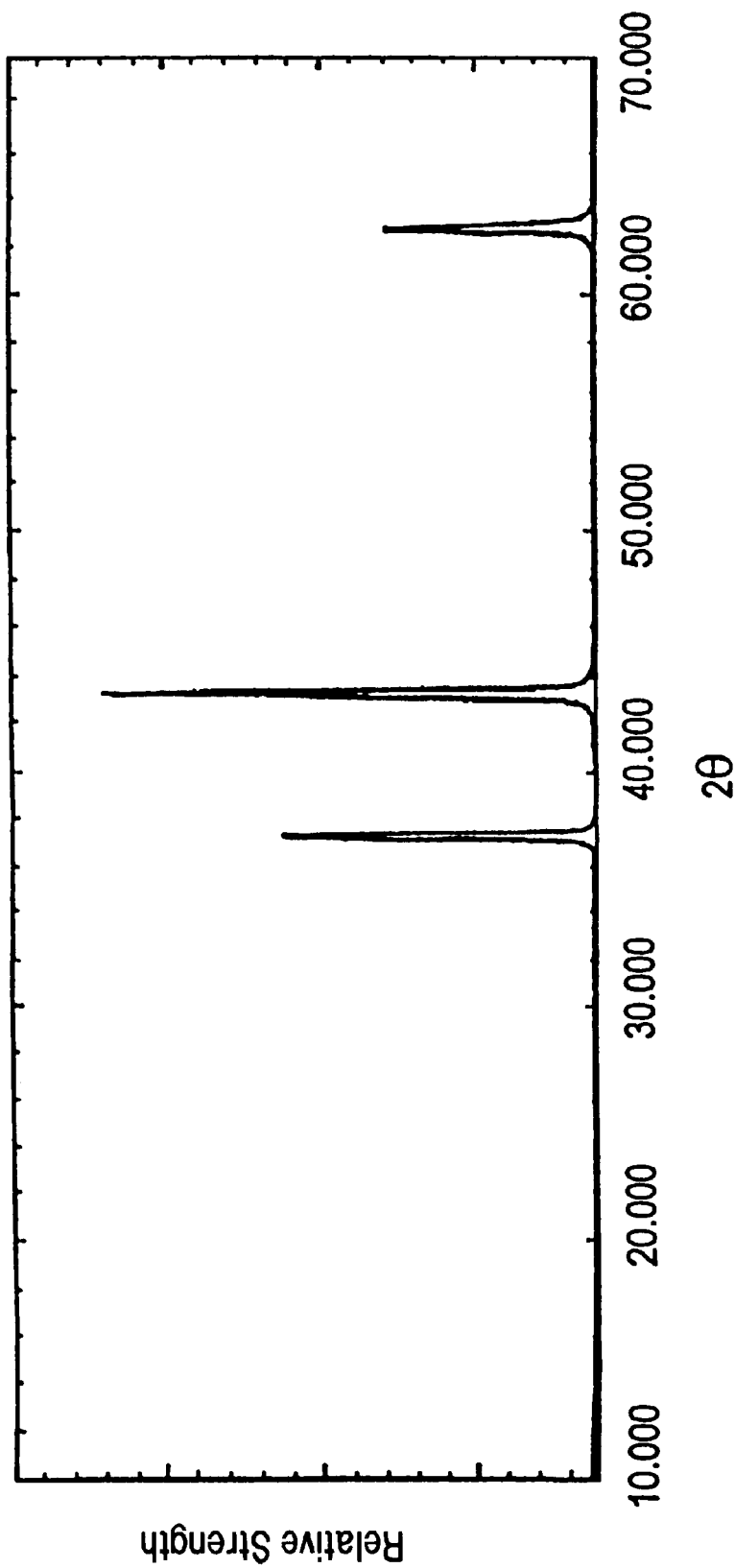
FIG. 2 is a powder X-ray diffraction pattern of $Ni_{0.8}Co_{0.2}O$ used for synthesizing a Li-containing complex oxide in the first exemplary embodiment of the present invention.
Figure 3:
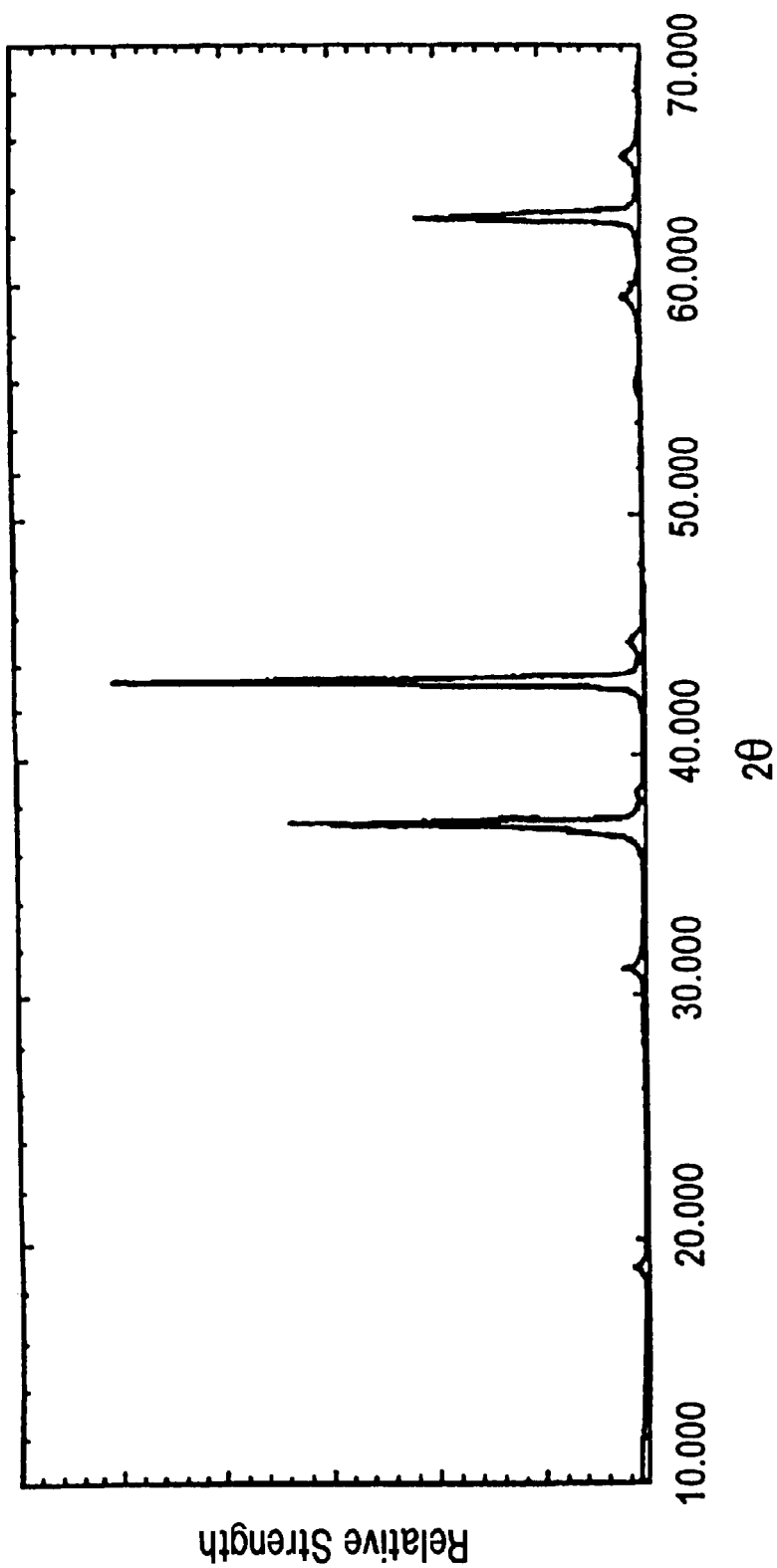
FIG. 3 is a powder X-ray diffraction pattern of a mixture of NiO and $CO_3O_4$ in a third conventional example.

Shown in FIG. 2 and FIG. 3 are respective powder X-ray diffraction patterns of $Ni_{0.8}Co_{0.2}O$ used in the present invention in which Ni and Co are considered to be in a state of a solid solution, and of a mixture of NiO and $CO_3O_4$ of the third conventional example, both used in synthesizing the Li-containing complex oxides shown in Table 3. As the source of beam for X-ray diffraction, $K\alpha$ beam from a Cu target was employed.

In FIG. 2, only 3 peaks are observed, namely, at $2q=37.1°\pm10$, $43.1°\pm1°$, and $62.6°\pm1°$. This indicates that Ni and Co atoms are uniformly dispersed and are in a state of a solid solution.

In contrast, the diffraction pattern in FIG. 3 shows many low peaks in addition to the 3 peaks. This suggests that the peaks of NiO and $C_3O_4$ are mixing.

When a nickel-cobalt oxide is prepared by thermally decomposing a co-precipitated $Ni_vCo_w(OH)_2$, Ni and Co will not always make a uniform solid solution. When a material in which Ni oxides and Co oxides are non-uniformly mixed without making a complete solid solution is used as a synthesizing material, it is not possible to obtain a positive active material having a high discharge capacity and a superior life characteristic as described before. It is therefore desirable to select as an adequate $Ni_vCo_wO$ material for synthesis the one in which Ni and Co are in a state of a solid solution at the atomic level and only 3 peaks are observed by powder X-ray diffraction analysis, i.e., at $2q=37.1°\pm1°$, $43.1°\pm1°$, and $62.6°\pm1°$.

In the foregoing exemplary embodiments, Co has been described in detail as an example of an element to substitute a part of Ni. It is to be noted that similar effect can be obtained by using at least one type of element selected from the group consisting of Mn, Cr, Fe, and Mg, in addition to Co.

Also, in the foregoing exemplary embodiments, although the firing temperature for synthesis of a Li-containing complex oxide was fixed at 700° C, in practice there was observed no particular problem when the temperature was within the range 700° C. to 900° C.

In obtaining a nickel oxide represented by a molecular formula $Ni_vCo_wO$ in which an element M is dissolved as a solid solution, a nickel hydroxide represented by a molecular formula $Ni_aM_b(OH)_2$ in which an element M has been uniformly dispersed by co-precipitation or other method was thermally decomposed at 250° C. –1000° C. in the foregoing exemplary embodiments. It can also be obtained by mixing a monohydrate of lithium hydroxide to nickel hydroxide in which an element M has been uniformly dispersed by co-precipitation or other method, and then heating at temperatures not lower than 250° C. and not higher than the melting point of lithium hydroxide, i.e., 445° C. Here, the reason for heating the lithium hydroxide at a temperature not higher than the melting point of lithium hydroxide was to dehydrate nickel hydroxide containing an element M without allowing synthesizing reaction of the nickel hydroxide containing M and lithium hydroxide to start.

Furthermore, although an organic electrolyte was described as an example of a non-aqueous electrolyte of a test cell in the exemplary embodiments, a solid polymer electrolyte or a solid electrolyte comprising an inorganic salt of lithium such as lithium iodide (LiI) is also effective.

It goes without saying that the present invention is not limited to the negative material, construction of the electrode group, the cell configuration, etc., which have been described in the exemplary embodiments.

INDUSTRIAL APPLICATION

The present invention provides a method of producing positive active materials for non-aqueous electrolyte secondary battery through synthesis of a Li-containing complex oxide obtained by firing in an oxidizing atmosphere a mixture of nickel oxide in which an element M (M representing at least one element from the group consisting of Co, Mn, Cr, Fe and Mg) is dissolved as a solid solution and LiOH or its hydrates. With this method of production, decrease of the $O_2$ partial pressure in the firing atmosphere during synthesis and mixed presence of $Li_2CO_3$ can be controlled. As a result, a non-aqueous electrolyte secondary battery employing this Li-containing complex oxide as the positive active material not only has a large initial capacity and a long cycle life characteristic but also its reliability can be increased in that the internal cell pressure does not increase due to storage at a high temperature in a charged state.

What is claimed is:

1. A method for producing a positive active material for a non-aqueous electrolyte secondary battery, said method comprising the steps of:

a) precipitating a hydroxide represented by a chemical formula $Ni_aM_b(OH)_2$ ($0.7 \leq a \leq 0.95$, a+b=1) by combining a solution of a nickel salt, and a salt of the element M (M being at least one element selected from the group consisting of Co, Mn, Cr, Fe, and Mg), b) thermally decomposing said hydroxide to form a mixture of a nickel oxide having an element M dissolved in a solid solution, and represented by a chemical formula $Ni_vM_wO$ ($0.7 \leq v \leq 0.95$, v+w=1); and c) firing said mixture in an oxidizing atmosphere with one of lithium hydroxide and a lithium hydroxide hydrate, to produce a lithium-containing complex oxide represented by a chemical formula $Li_xNi_yM_zO_2$ (0.90≦x≦1.10, 0.7≦y≦0.95, y+z=1).

2. The method as in claim 1, wherein the firing is carried out at a temperature in a range of 700° C. to 900° C.

3. The method as in claim 1, wherein said thermally decomposing said hydroxide is carried out at a temperature in a range of 250° C. to 1000° C.

4. The method of producing a positive active material for a non-aqueous electrolyte secondary battery as in claim 3, wherein said nickel oxide comprises a nickel oxide having peaks at 3 angles, i.e., 2q=37.1°±1°, 43.1°±1°, and 62.6°±1°, in powder X-ray diffraction analysis using a Kα beam produced from a Cu target beam source.

5. The method of producing a positive active material for a non-aqueous electrolyte secondary battery as in claim 1, wherein said nickel oxide comprises a nickel oxide having peaks at 3 angles, i.e., 2q=37.1°±1°, 43.1°±1°, and 62.6°±1°, in powder X-ray diffraction analysis using a Kα beam produced from a Cu target beam source.

6. The method as in claim 1, wherein said step of precipitating a hydroxide represented by a chemical formula $Ni_aM_b(OH)_2$ (0.7≦a≦0.95, a+b=1) comprises:

combining an aqueous solution of said nickel salt and said salt of the element M, with an aqueous solution of sodium hydroxide to form a precipitate;

washing said precipitate with water; and filtering and drying said precipitate to form said hydroxide represented by a chemical formula $Ni_aM_b(OH)_2$ (0.7≦a≦0.95, a+b=1).

7. The method as in claim 6, wherein said nickel salt comprises nickel sulfate, and said salt of the element M comprises a sulfate of the element M.

8. The method as in claim 1, further comprising the steps of:

d) pulverizing said lithium-containing complex oxide to form a positive active material powder; and e) forming a paste by combining said positive active material powder with acetylene black, a fluorocarbon resin binder, and N- methylpyrolidinone, and blending.

* * * * *